United States Patent [19]

Joy

[11] Patent Number: 4,759,178
[45] Date of Patent: Jul. 26, 1988

[54] AIRCRAFT AUXILIARY POWER UNIT
[75] Inventor: John R. Joy, Brighton, Mich.
[73] Assignee: Williams International Corporation, Walled Lake, Mich.
[21] Appl. No.: 26,829
[22] Filed: Mar. 17, 1987
[51] Int. Cl.⁴ .............................................. F02C 6/00
[52] U.S. Cl. ................. 60/39.142; 60/39.181; 60/39.462
[58] Field of Search ............ 60/39.142, 39.15, 39.181, 60/39.462

[56] References Cited
U.S. PATENT DOCUMENTS

| 2,599,480 | 6/1952 | Pfenninger | 60/39.181 |
| 3,660,977 | 5/1972 | Reynolds | 60/39.462 |
| 3,898,794 | 8/1975 | Ariga | 60/39.181 |
| 3,965,673 | 6/1976 | Friedrich | 60/39.142 |
| 4,077,202 | 3/1978 | Schutze | 60/39.142 |
| 4,092,824 | 6/1978 | Friedrich | 60/39.142 |

FOREIGN PATENT DOCUMENTS 935638  6/1982  U.S.S.R. ........................ 60/39.142

Primary Examiner—Louis J. Casaregola
Attorney, Agent, or Firm—Lyman R. Lyon

[57] ABSTRACT

An aircraft auxiliary power unit that starts and operates at all operational flight altitudes of an aircraft. The unit can provide constant power output irrespective of altitude and additional power during periods of increased demand.

6 Claims, 1 Drawing Sheet

AIRCRAFT AUXILIARY POWER UNIT

BACKGROUND OF THE INVENTION

The invention relates to aircraft auxiliary and/or emergency power systems.

The normal power requirements of an aircraft in flight are satisfied by the main engine(s) and the power system(s) connected thereto. There is a need, however, to supply power to various components of the aircraft prior to the starting, and after the stopping, of the main engine; to effectuate main engine start-up; and to handle peak power demands of the aircraft during flight operations. Moreover, an aircraft in flight may require emergency power within a few seconds after a main engine failure or after a failure of a power system driven thereby. The prior art teaches the use of a back-up power system—a so-called Emergency Power Unit (EPU)—comprising a gas generator and hot gas turbine to generate such emergency power. However, the monopropellant or bipropellant fuel typically used by such an EPU frequently carries with it the hazard of sudden, uncontrolled detonation. There are also substantial weight and cost penalties in carrying sufficient quantities of such a dedicated fuel.

Alternatively, the prior art teaches the use of a Brayton cycle gas turbine engine using JP-type fuels—a so-called Auxiliary Power Unit (APU)—to satisfy the power demands of the aircraft in an emergency. The specific fuel consumption of a JP-fueled APU is typically one order of magnitude less than that of a prior art EPU. Moreover, such an APU utilizes the same fuel as the main engine(s) and, therefore, does not require any such dedicated fuel. However, the typical APU cannot be started quickly enough to satisfy the need for emergency power. Indeed, an APU using JP-type fuel simply cannot be started or operated at the highest altitudes where modern aircraft fly due to the inability of the compressor to provide sufficient air pressure to permit ignition, or sustain combustion, of the fuel. Moreover, the maximum power output of an APU using JP-type fuel is markedly reduced as the ambient pressure and temperature external to the aircraft decrease with increasing altitude.

SUMMARY OF THE INVENTION

It is the purpose of the instant invention to provide an aircraft auxiliary power system that is readily started and operated at all operational flight altitudes of an aircraft.

It is also the purpose of the instant invention to provide an aircraft auxiliary power system that will require a lesser quantity of dedicated fuel, thereby reducing the safety hazard, weight and cost incident thereto.

It is a further purpose of the instant invention to provide an aircraft auxiliary power system that will produce a constant power output, notwithstanding the large variation in ambient pressure conditions incident to changes in flight altitude, while having increased capacity at lower altitudes to facilitate main engine start-up.

The invention accomplishes these purposes by means of an auxiliary power unit comprising a gas expansion motor and a Brayton cycle gas turbine engine which jointly power a common load. The expansion motor is fueled by decomposed monopropellant or partially-oxidized bipropellant as provided by a gas generator. The Brayton cycle engine is fueled in whole or in part by the exhaust from the expansion motor, with the fuel complement consisting of the JP-type fuel utilized by the main engine(s) of the aircraft. The ratio of expansion motor exhaust to JP-type fuel utilized by the Brayton cycle engine is determined by aircraft altitude and mach number, and the amount of power output desired. The introduction of the highly combustible expansion motor exhaust into the combustion chamber of the Brayton cycle engine facilitates starting and allows continued operation of the engine at altitudes where its compressor cannot otherwise provide sufficient air pressure to permit ignition or sustain operation of the engine with a JP-type fuel alone. A substantial reduction in the quantity of expansion motor fuel otherwise required by a prior art EPU is realized through the ability of the power unit of the instant invention to revert to JP-type fuel consumption as quickly as ambient pressure permits. The potential safety hazard incident to the use of such fuels is thereby lessened, and the substantial weight and cost penalties associated with an EPU-dedicated fuel and its related control systems are also reduced.

The expansion motor provides power for rapid start-up of the power unit of the instant invention. Where a constant output from the power unit is desired irrespective of altitude, the expansion motor provides power to complement the output of the Brayton cycle engine, whose power output decreases with altitude. Thus, by continuous adjustment of the quantities of combustibles passing through the expansion motor and Brayton cycle engine, a constant power output is achieved at all operational flight altitudes of an aircraft. In contradistinction, a prior art APU providing a constant power output of similar magnitude would be unduly large, particularly inefficient at low altitudes due to its size, and would operate over a lesser range of altitudes.

The auxiliary power unit of the instant invention provides reserve capacity irrespective of altitude. The output of the power unit is increased at lower altitudes merely by increasing the amount of JP-type fuel supplied to the combustion chamber of the Brayton cycle engine. The output of the unit is increased at higher altitudes by increasing the amount of decomposed monopropellant or partially-oxidized bipropellant supplied to the expansion motor which, when exhausted into the combustion chamber of the gas turbine engine, would provide greater power output from both the expansion motor and the Brayton cycle engine.

DETAILED DESCRIPTION OF THE PREFERRED EMBODIMENT OF THE INVENTION

Figure 1:
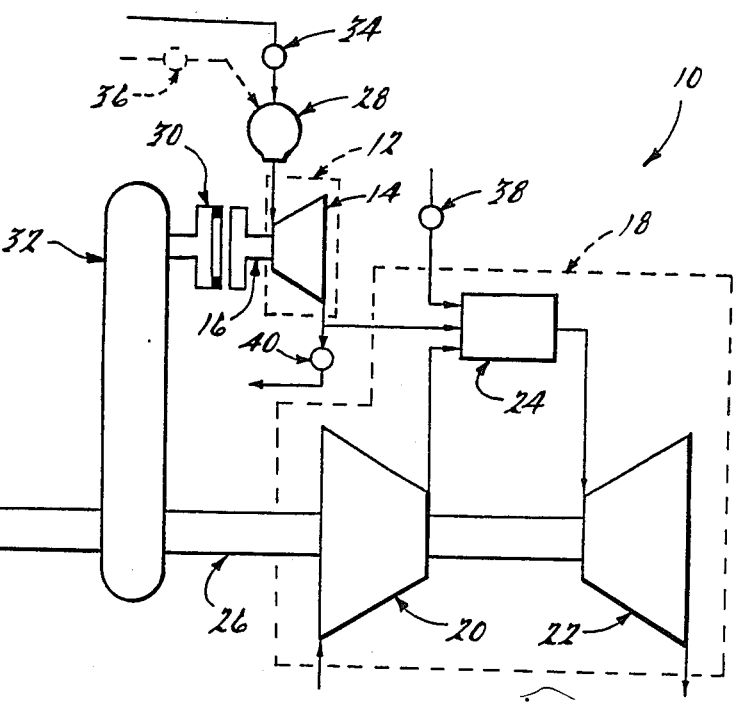
FIG. 1 is a schematic diagram of an auxiliary power unit constructed in accordance with the instant invention.

As illustrated schematically in FIG. 1, an auxiliary power unit 10 constructed in accordance with the instant invention comprises a gas expansion motor 12, herein disposed of as a turbine 14, having an power output shaft 16; a Brayton cycle gas turbine engine 18 having a compressor 20, a turbine 22, a combustion chamber 24, and a power input/output shaft 26; a gas generator 28; and a friction clutch 30 and a gearbox 32 to mechanically link the output shaft 16 of the gas expansion motor 12 connected to the input/output shaft 26 of the Brayton cycle engine 18.

A liquid monopropellant such as a mixture of hydrazine, water and hydrazinium nitrate ($H_2NNH_2$, $H_2O$ and $N_2H_4 \cdot HNO_3$, respectively) is delivered under pressure through a valve 34 into the gas generator 28. Alternatively, the constituents of a hypergolic bipropellant such as hydrazine and nitrogen tetroxide ($H_2NNH_2$ and $N_2O_4$, respectively) are delivered under pressure through valves 34 and 36, respectively, into the gas generator 28. The gas to drive the turbine 14 of the expansion motor 12 is produced in the gas generator 28 by the controlled catalytic decomposition of the monopropellant, or partial oxidation of the bipropellant, introduced therein. For example, the catalytic decomposition of the hydrazine, water and hydrazinium nitrate monopropellant produces nitrogen, hydrogen, ammonia, and steam ($N_2$, $H_2$, $NH_3$, and $H_2O$, respectively). It should be noted that high pressure may also be achieved in the gas generator 28 by partial constant volume combustion of the liquid fuel.

The high pressure fuel decomposition/oxidation products exit the gas generator 28 and are routed through the gas expansion motor 12, wherein the products impinge upon the blades of the expansion motor turbine 14. A mechanical output is thus generated to start the Brayton cycle engine 18 via the friction clutch 30 and gearbox 32.

The exhaust of the gas expansion motor 12 is introduced into the combustion chamber 24 of the Brayton cycle engine 18. The high-temperature hydrogen-rich exhaust facilitates starting of the Brayton cycle engine 18 at high altitudes, as it can ignite notwithstanding the much reduced air pressure available to, and, hence, supplied to the combustion chamber 24 by, the engine's compressor 20. Subsequent to start-up, the power output of the expansion motor 12 and the amount of expansion motor exhaust supplied to the combustion chamber 24 of the Brayton cycle engine 18 are adjusted to provide the difference between aircraft power demands and the maximum power that the Brayton cycle engine 18 can provide alone.

The combustion chamber 24 of the engine 18 is additionally supplied with JP-type fuel under pressure by operation of a valve 38 at altitudes which are sufficiently low to achieve satisfactory combustion. At low altitudes where the Brayton cycle engine 18 is operated satisfactorily solely with JP-type fuel, and where it can produce the required power, the expansion motor 12 is shut down by stopping the flow of liquid fuel to the gas generator 28, thereby conserving the dedicated fuel. As the aircraft achieves greater altitudes, the flow of JP-type fuel into the combustion chamber 24 is reduced and the dedicated fuel is once again directed through the expansion motor 12 to provide both expansion motor output shaft power and a more combustible fuel mixture for combustion in the Brayton cycle engine 18. At the highest altitudes, low combustion chamber pressure may dictate the exclusive combustion of expansion motor exhaust within the combustion chamber 24 of the Brayton cycle engine 18. Moreover, the demand for power may exceed the power available from the expansion motor 14 and the Brayton cycle engine 18 when all the gas passing through the expansion motor 14 is delivered to the engine's combustion chamber 24. Under such circumstances, the gas delivered to the expansion motor 14 is increased by increasing the pressure in the gas generator 28, thereby increasing the power output of the expansion motor 14. The exhaust from the expansion motor 14 which is in excess of the requirements of the Brayton cycle engine 18 is vented to the atmosphere through a valve 40.

Figure 2:
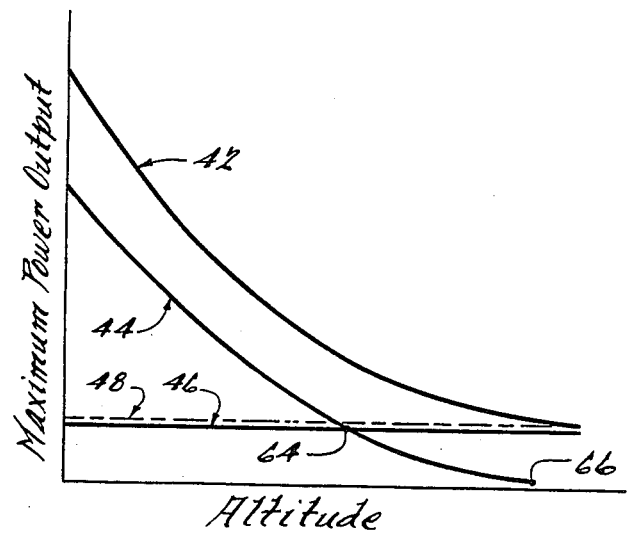
FIG. 2 is a graph showing maximum power output as a function of altitude for (1) the power unit of FIG. 1; (2) a prior art EPU; and (3) a prior art APU.

FIG. 2 is a graph of the relationship between maximum power output and altitude. Line 42 of FIG. 2 represents the power output available from the power unit 10 of the instant invention. Also plotted in FIG. 2 are the maximum power curves of a prior art APU using JP-type fuel (line 44) and a prior art EPU using a hydrazine-based fuel fed thereto at a constant pressure (line 46). FIG. 2 clearly illustrates the ability of the power unit 10 of the instant invention to provide a greater power output over a wider range of altitude than either the prior art APU or the prior art EPU. Thus, the power unit 10 is able to provide a greater magnitude of constant power output irrespective of altitude (e.g., line 48 of FIG. 2) than either of the prior art units individually. Indeed, even the output of a power system comprised of both prior art units having a power output equal to that of each prior art unit combined (hereinafter "combined prior art system") fails to equal the output of the power unit 10 of the instant invention at the highest altitudes, as the prior art APU ceases to operate due to a lack of air pressure at such altitudes, thereby limiting the high altitude output of such a combination to that of the prior art EPU alone. Additionally, the power unit 10 of the instant invention provides a reserve capacity at low altitude far in excess of either of the prior art units.

Figure 3:
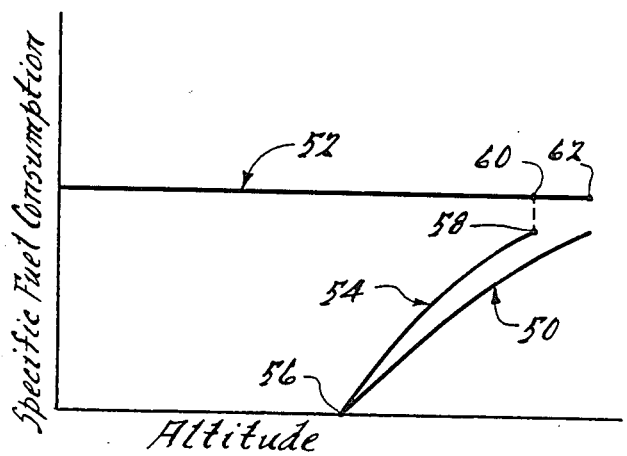
FIG. 3 is a graph showing specific consumption of dedicated fuel as a function of altitude required to maintain a constant power output irrespective of altitude for (1) the power unit of FIG. 1; (2) a prior art EPU operating alone; and (3) a combined prior art system comprised of a prior art EPU and a prior art APU, wherein the prior art EPU supplies additional shaft power to supplement the power output of the prior art APU at high altitudes.

The synergism achieved in the power unit 10 of the instant invention is clearly shown in FIG. 3 which comprises a graph of the relationship between specific consumption of dedicated fuel and altitude for the power unit 10 (line 50), the prior art EPU (line 52), and the aforementioned combined prior art system (line 54 as defined by points 56, 58, 60 and 62). Since the level of constant power output achievable by the power unit 10 of the instant invention is in excess of that achievable by either of the other power systems of FIG. 3, the levels of specific fuel consumption plotted therein are based upon maintenance of the maximum level of constant power output achievable by the prior art EPU (i.e., line 46 of FIG. 2).

Line 50 represents the specific dedicated fuel consumption of the power unit 10 of the instant invention. From sea-level to the altitude corresponding to point 64 on line 48 of FIG. 2 (shown as point 56 of FIG. 3), the power unit 10 of the instant invention is fueled solely by JP-type fuel. Hence, the dedicated fuel is not consumed at low altitudes, as there is sufficient air pressure to enable the Brayton cycle engine 18 operating solely on JP-type fuel to supply all of the required power. As the altitude increases above that corresponding to point 64 of FIG. 2 (point 56 of FIG. 3), liquid fuel is supplied to the gas generator 32 in increasing amounts so that the combined power output of the expansion motor 14 and the Brayton cycle engine 18 utilizing JP-type fuel increasingly enriched with expansion motor exhaust provides the required amount of power output. Eventually, the supply of JP-type fuel to the Brayton cycle engine 18 is terminated, and a portion of the exhaust from the gas generator 32 is vented to the atmosphere through valve 40. The Brayton cycle engine 18, however, continues to operate on the expansion motor exhaust fed thereto. The engine 18 thus continues to contribute power output at such altitudes, thereby reducing the required power contribution and, commensurately, the dedicated fuel consumption of the expansion motor 14.

The fuel consumption of a prior art EPU (line 52 of FIG. 3) effectively remains constant at all altitudes, as the power output of the prior art EPU is relatively unaffected by the drop in back-pressure associated with increasing altitude. The savings of dedicated fuel through utilization of the power unit 10 of the instant invention over such a prior art EPU is clearly demonstrated in FIG. 3 as the area bounded by the x-axis, y-axis, line 52, and line 50.

Line 54, as defined by points 56, 58, 60 and 62, represents the specific dedicated fuel consumption of the combined prior art system comprised of a prior art EPU fueled by the dedicated fuel and a prior art APU fueled solely by JP-type fuel. The power output of the combined prior art system equals the sum of the shaft output power of each of the prior art units. From sea-level to the altitude corresponding to point 64 on line 48 of FIG. 2 (point 56 of FIG. 3), the combined prior art system generates the required power solely with JP-type fuel supplied to the prior art APU, consuming none of the EPU's dedicated fuel. As the altitude increases above that corresponding to point 64 of FIG. 2 (point 56 of FIG. 3), liquid fuel is supplied to the gas generator 28 in increasing amounts so that the combined shaft output of the prior art EPU and the prior art APU utilizing JP-type fuel alone provides the required power output. Since the fuel utilized by the prior art APU is not enriched with expansion motor exhaust as in the instant invention, a greater percentage of total system power must be generated by the prior art EPU, thereby necessitating increased consumption of dedicated fuel in comparison with the power unit 10 of the instant invention, as indicated by lines 54 and 50 of FIG. 3.

At the altitude corresponding to point 66 of FIG. 2 (point 58 on line 54 of FIG. 3), the compressor of the prior art APU is no longer able to supply sufficient air pressure for the continued combustion of its JP-type fuel, and the prior art APU ceases to operate. Thus, the required power must be supplied entirely supplied by the prior art EPU utilizing dedicated fuel. The required jump in power output generated by the prior art EPU, and the commensurate jump in dedicated fuel consumption resulting therefrom, is illustrated by the discontinuous segment of line 54, between points 58 and 60, of FIG. 3. The consumption of dedicated fuel by the combined prior art system above the altitude corresponding to point 60 is identical to that of the prior art EPU acting alone (line 52). Thus, the savings of dedicated fuel through utilization of the power unit 10 of the instant invention over such a combined prior art system is clearly demonstrated in FIG. 3 as the area between lines 50 and 54.

While the preferred embodiment of the invention has been disclosed, it should be appreciated that the invention is susceptible of modification without departing from the spirit of the invention or the scope of the subjoined claims.

I claim:

1. A power system comprising
   a Brayton cycle gas turbine engine having a compressor, a combustion chamber, a turbine, and a power input/output shaft;
   a gas expansion motor having a power output shaft mechanically linked with the input/output shaft of said Brayton cycle engine, whereby the power output of said expansion motor serves to start said Brayton cycle engine and to augment the power output of said Brayton cycle engine;
   a gas generator for supplying a combustible gas under pressure to said gas expansion motor, said combustible gas under pressure being generated in said gas generator by controlled catalytic decomposition of a monopropellant; and
   fluid control means whereby the exhaust from said expansion motor is introduced into the combustion chamber of said Brayton cycle engine, whereby said Brayton cycle engine operates at a lower combustion chamber pressure.

2. A power system comprising
   a Brayton cycle gas turbine engine having a compressor, a combustion chamber, a turbine, and a power input/output shaft;
   a gas expansion motor having a power output shaft mechanically linked with the input/output shaft of said Brayton cycle engine, whereby the power output of said expansion motor serves to start said Brayton cycle engine and to augment the power output of said Brayton cycle engine;
   a gas generator for supplying a combustible gas under pressure to said gas expansion motor, said combustible gas under pressure being generated in said gas generator by partial oxidation of a bipropellant; and
   fluid control means whereby the exhaust from said expansion motor is introduced into the combustion chamber of said Brayton cycle engine, whereby said Brayton cycle engine operates at a lower combustion chamber pressure.

3. A power system comprising
   a Brayton cycle gas turbine engine having a compressor, a combustion chamber, a turbine, and a power input/output shaft;
   means for supplying a first combustible gas under pressure to the combustion chamber of said Brayton cycle engine;
   a gas expansion motor having a power output shaft mechanically linked with the input/output shaft of said Brayton cycle engine, whereby the power output of said expansion motor serves to start said Brayton cycle engine or to augment the power output of said Brayton cycle engine;
   means for supplying a second combustible gas under pressure to said gas expansion motor, said second combustible gas being of greater combustibility than said first combustible gas; and
   fluid control means whereby said expanded second combustible gas exhausted from said expansion motor is introduced into the combustion chamber of said Brayton cycle engine to complement said first combustible gas introduced thereinto, whereby said Brayton cycle engine operates over a wider range of combustion chamber pressures than when operating solely on said first combustible gas.

4. The power system of claim 3 wherein said means for supplying said second combustible gas under pressure comprises a gas generator, said second combustible gas under pressure being generated therein by the controlled catalytic decomposition of a monopropellant introduced thereinto.

5. The power system of claim 3 wherein said means for supplying said second combustible gas under pressure comprises a gas generator, said second combustible gas under pressure being generated therein by the partial oxidation of a bipropellant introduced thereinto.

6. The power system of claim 3 wherein said gas expansion motor comprises a turbine.

* * * * *